US 8,333,844 B2

(12) United States Patent
Teichroeb et al.

(10) Patent No.: US 8,333,844 B2
(45) Date of Patent: Dec. 18, 2012

(54) OIL SPILL RECOVERY SYSTEM

(76) Inventors: Jake Teichroeb, Comber (CA); Juan Wiebe S., Coatsworth (CA)

( * ) Notice: Subject to any disclaimer, the term of this patent is extended or adjusted under 35 U.S.C. 154(b) by 0 days.

(21) Appl. No.: 13/044,715

(22) Filed: Mar. 10, 2011

(65) Prior Publication Data
US 2011/0155673 A1    Jun. 30, 2011

Related U.S. Application Data

(62) Division of application No. 11/769,014, filed on Jun. 27, 2007, now Pat. No. 7,927,490.

(60) Provisional application No. 60/817,221, filed on Jun. 28, 2006.

(51) Int. Cl.
B08B 3/02       (2006.01)
B08B 3/10       (2006.01)
B01D 12/00      (2006.01)
B01D 21/02      (2006.01)

(52) U.S. Cl. ............... 134/10; 134/26; 134/34; 134/40; 210/177; 210/747.5; 210/767; 210/806; 210/922; 208/391

(58) Field of Classification Search ............ 134/26, 134/31, 40; 208/391; 210/177, 767, 774, 210/922, 747.5, 806
See application file for complete search history.

(56) References Cited

U.S. PATENT DOCUMENTS

| | | | |
|---|---|---|---|
| 210,256 A | | 11/1906 | Crozier |
| 1,204,370 A | | 11/1916 | McComb |
| 1,464,071 A | | 8/1923 | Glover |
| 1,754,119 A | * | 4/1930 | Frank ............... 210/117 |
| 4,132,645 A | | 1/1979 | Bottomley et al. |
| 4,358,373 A | * | 11/1982 | Jubenville ............ 210/181 |
| 4,396,508 A | | 8/1983 | Broughton |
| 4,402,552 A | * | 9/1983 | Bass et al. ............... 299/7 |
| 4,533,459 A | * | 8/1985 | Dente et al. ............ 208/391 |
| 4,554,074 A | | 11/1985 | Broughton |
| 5,066,407 A | | 11/1991 | Furlow |
| 5,236,585 A | | 8/1993 | Fink |
| 5,298,167 A | * | 3/1994 | Arnold ................ 210/703 |
| 5,725,760 A | | 3/1998 | Monteith |
| 6,074,549 A | * | 6/2000 | Bacon Cochrane et al. .. 208/391 |
| 6,089,381 A | | 7/2000 | Gordon |
| 7,314,549 B2 | | 1/2008 | Swift |
| 2004/0222149 A1 | | 11/2004 | Abrams |
| 2005/0173337 A1 | * | 8/2005 | Costinel ............... 210/519 |

FOREIGN PATENT DOCUMENTS

CA      2052085 A  *  3/1993

* cited by examiner

Primary Examiner — Michael Kornakov
Assistant Examiner — Natasha Campbell
(74) Attorney, Agent, or Firm — Carlson, Gaskey & Olds PC

(57) ABSTRACT

A method for separating an oil-substance mixture includes communicating the oil-substance mixture into a first separator tank to separate the oil from the substance, and communicating a remaining portion of the oil-substance mixture into a second separator tank to separate the oil from the substance of the remaining portion.

17 Claims, 4 Drawing Sheets

OIL SPILL RECOVERY SYSTEM

CROSS REFERENCE TO RELATED APPLICATION

This application is a divisional application of U.S. patent application Ser. No. 11/769,014 filed Jun. 2, 2007, which is now U.S. Pat. No. 7,927,490, which claims priority to U.S. Provisional Application Ser. No. 60/817,221, filed on Jun. 28, 2006.

BACKGROUND

This disclosure generally relates to an oil spill recovery system, and more particularly to a method of separating an oil mixture.

Oil spills are an increasing problem in today's society. The increasing size and frequency of oil spills on the earth's waterways, lakes, rivers and oceans, is devastating to the ecologically sensitive environment of the earth. In addition, and due to the increasing dependency of humans on the use of oil, gasoline and diesel, oil spills can be potentially devastating to the world's economy.

Oil recovery systems are known for aiding in the clean up of oil spills on the earth's waterways or land masses. One known oil spill recovery system includes the use of a large sponge to soak up the contaminated water. Once the contaminated water is absorbed by the sponge, any excess water is squeezed out of the sponge. The sponge is then rolled up and transferred to a landfill where it is buried.

Other oil spill recovery systems include the ability to separate oil from water. An oil-water mixture is pumped into a separator apparatus. The oil separates to the top of the separator apparatus due to the difference in density of the oil from the water. Once separated, the oil may be removed from the top of the apparatus while the water may be separately removed from the bottom of the apparatus. However, oil separators of this type are typically quite large which may limit their use to large oil spills only. In addition, oil separators may be susceptible to remixture of the oil and water within the separator apparatus due to rough water or strong currents which cause instability of the vessel the oil separator is carried on.

SUMMARY

An exemplary method for separating an oil-substance mixture includes communicating the oil-substance mixture into a first separator tank to separate the oil from the substance, and communicating a remaining portion of the oil-substance mixture into a second separator tank to separate the oil from the substance of the remaining portion.

Another exemplary method for separating an oil-substance mixture includes filling a first separator tank with boiling water, communicating the oil-substance mixture into the first separator tank to separate the oil from the substance, and communicating the oil and the boiling water from the first separator tank into a second separator tank to separate the oil from the boiling water.

The various features and advantages of this disclosure will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
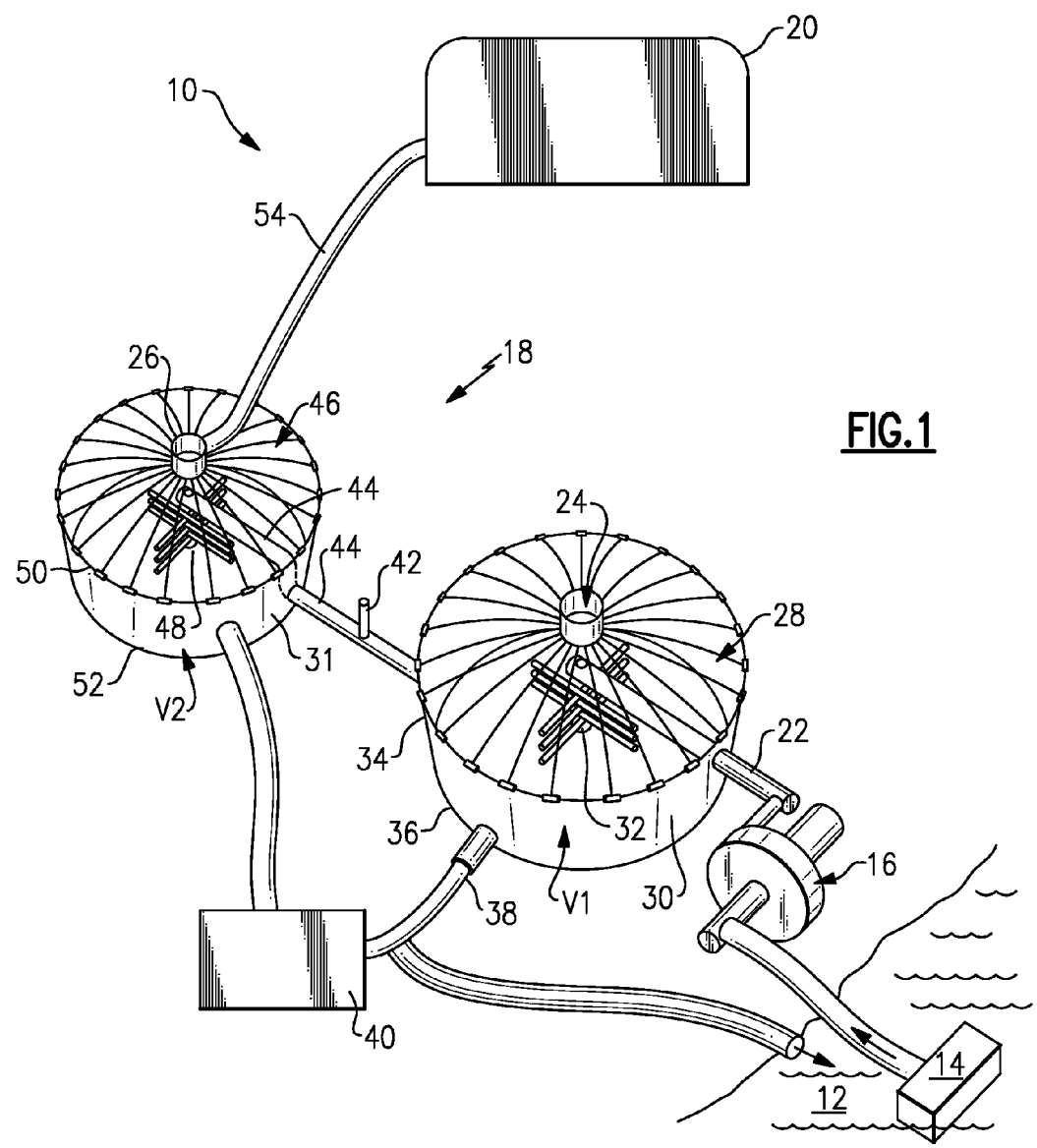
FIG. 1 is a perspective view of an example oil spill recovery system having multiple stages.

Referring to FIG. 1, an oil spill recovery system 10 for cleaning a body of water 12, such as an ocean, river, stream or any other waterway, includes a collector head 14, a pump 16, an oil-water separator 18 and an oil storage tank 20. Although the oil spill recovery system 10 of the present disclosure is shown and described in terms of separation of water from oil, it should be understood that gas, diesel or any other substances may be separated by the example oil spill recovery system 10. In addition, the oil spill recovery system 10 may be utilized to clean any type of land mass that is contaminated by the occurrence of an oil spill.

The collector head 14 utilizes a suction created by the pump 16 to lift an oil-water mixture from the body of water 12, for example. The oil-water mixture is communicated from the collector head 14 to a conduit 22. The collector head 14 may be any known apparatus for lifting an oil-water mixture from a body of water 12. In one example, the collector head includes pontoon floats to enable the flotation of the collector head 14 on the body of water 12.

In one example, the pump 16 is a vacuum pump. In another example, the pump 16 is a venturi type pump. It should be understood that any known pump may be utilized with the example oil spill recovery system 10. The specific size and power capabilities of the pump will vary depending upon the size of the waterway being cleaned, the speed at which the contamination must be removed and other design specific parameters.

An example oil-water separator 18 includes a two-stage separator with a first separator tank 24 and a second separator tank 26. It should be understood that the actual number of stages utilized by the oil spill recovery system 10 will vary according to the size of the body of water 12 being cleaned, the speed at which the contamination must be removed and other design specific parameters.

The oil-water separator 18 includes the first separator tank 24 and the second separator tank 26. In one example, the first separator tank 24 defines a first volume V1 which is different from a second volume V2 defined by the second separator tank 26. The first separator tank 24 and the second separator tank 26 each include a tank cover 28, 46, respectively, which seal the Volumes V1, V2 defined by each of the first separator tank 24 and the second separator tank 26. The tank covers 28, 46, combined with the suction created by the pump 16, maintain a constant pressure within the first separator tank 24 and the second separator tank 26. Advantageously, the constant pressure achieved within the first separator tank 24 and the second separator tank 26 maintains the separation of the water from the oil within the tanks 26, 28, during unstable periods. That is, the water remains separated from the oil even where the vessel (i.e., boat, truck, etc.) carrying the oil-water separator 18 rocks, shifts, etc. Therefore, the example oil-water separator 18 provides the advantage of being moveable.

Figure 2:
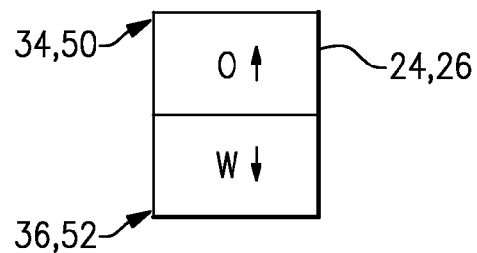
FIG. 2 is a schematic representation of the separation of an oil-water mixture into a water phase and an oil phase.

In the first stage of the oil-water separator 18, the oil-water mixture enters through a sidewall 30 of the first separator tank 24 via the conduit 22. In one example, the conduit 22 is a flexible hose. The oil-water mixture is communicated from the conduit 22 to an intake pipe 32. The oil-water mixture exits the intake pipe 32 via a plurality of apertures 61 (see FIG. 4) and enters the first volume V1 of the first separator tank 24. Once inside the first volume V1 of the first separator tank 24, the oil and water separate into an oil phase O and a water phase W by virtue of their different specific gravities (see FIG. 2). In addition, the constant pressure maintained within the first separator tank 24 further forces the water and the oil to separate into the oil phase O and the water phase W.

In one example, oil is forced to rise toward a top end 34 of the first separator tank 24 and water trickles toward a bottom end 36 of the first separator tank 24. In the event that water exits the intake pipe 32 above the oil phase O, the water trickles through the oil phase O as it gravitates toward the bottom end 36. As the water passes through the oil phase, the water has a tendency to let go of its oil content, i.e., oil molecules attract one another.

The water that accumulates at the bottom end 36 of the first separator tank 24 is discharged via a discharge conduit 38. In one example, the water is discharged from the first separator tank 24 to a water reservoir 40. In another example, the water is returned to the body of water 12 from which it was removed. The water may be discharged from the first separator tank 24 in any known manner.

A valve system 42 is positioned between the first separator tank 24 and the second separator tank 26 to control the pressure within the first volume V1 of the first separator tank 24 and to control the communication of oil phase O from the first separator tank 24 to the second separator tank 26. The valve system 42 is selectively closed to increase the pressure inside the first separator tank 24 and facilitate the separation of the oil-water mixture into the oil phase O and the water phase W. The valve system 42 is selectively opened to allow a remaining amount of the oil-water mixture to enter the second separator tank 26 via conduit 44.

The second separator tank 26 represents a second stage of the example oil spill recovery system 10. In some instances, the oil-water mixture that enters the first separator tank 24 completely separates the water from the oil. However, the second stage of the oil spill recovery system 10 is provided to ensure the complete separation of the oil from the water.

The second separator tank 26 is similar to the first separator tank 24 and includes a tank cover 46 to provide a completely pressurized tank. However, the second separator tank 26 preferably defines a second volume V2 which is a different volume than the first volume V1 of the first separator tank 24. A second intake pipe 48 is positioned within the second separator tank 26 and in communication with the conduit 44. The conduit 44 is communicated through a sidewall 31 of the second separator tank 26. In one example, the conduit 44 is positioned through the sidewall 31 at a different height as the conduit 22 along sidewall 31 of the first separator tank 24. This facilitates the maintenance of the pressure within the first and second separator tanks 24, 26.

The oil-water mixture communicated from the first separator tank 24 exits the second intake pipe 48 through a plurality of apertures 61 (see FIG. 3) and enters the volume V2. Upon separation due to varying pressures within the oil-water separator 18 and the specific gravity difference between the water and the oil, the separated oil settles at the top end 50 of the second separator tank 26 and the water settles at a bottom end 52 of the second separator tank 26. The separated oil is communicated via a discharge oil conduit 54 to the oil storage tank 20. The separated water is communicated via a discharge water conduit 56 to either the water reservoir 20 or returned to the body of water 12 from which it was removed. In one example, a pump is utilized to remove the water and oil from the second separator tank 26.

Figure 3:
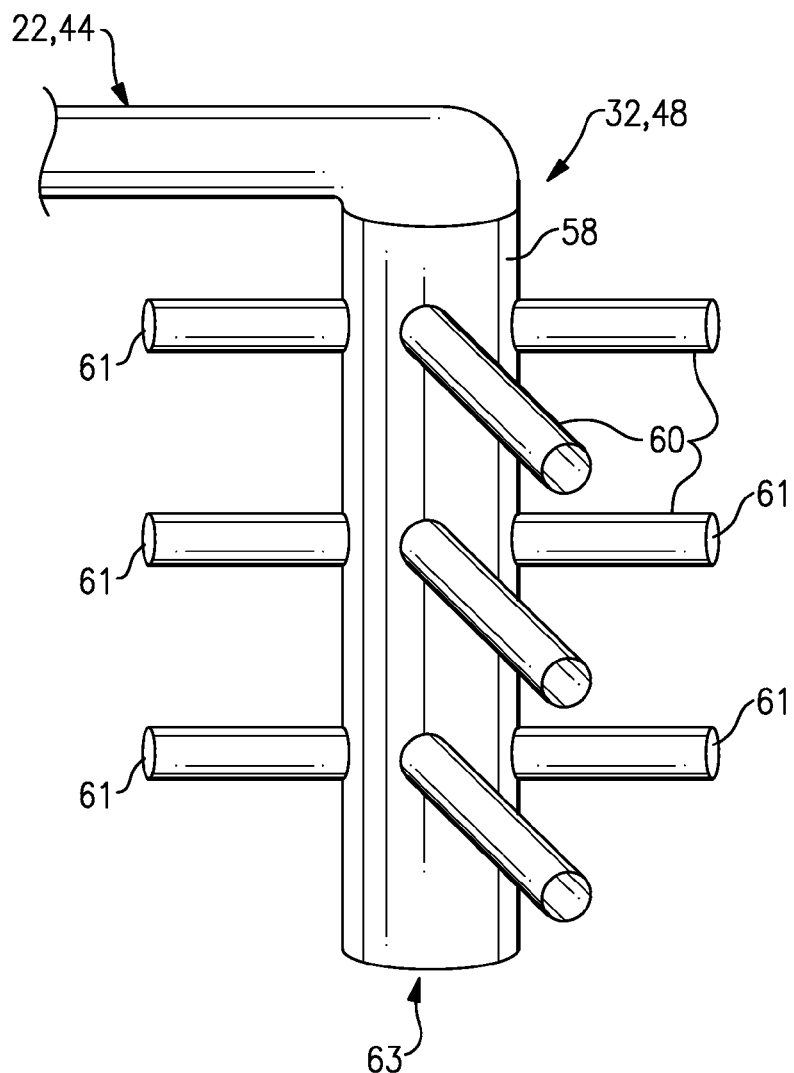
FIG. 3 is a perspective view of an example inlet pipe configuration for the example oil spill recovery system illustrated in FIG. 1.

FIG. 3 illustrates the intake pipes 32, 48 of the separator tanks 24, 26. The intake pipes 32, 48 include a central pipe 58 and a plurality of branch outlets 60. In one example, the central pipe 58 and the plurality of branch outlets 60 are stainless steel. However, other materials may comprise these components. The central pipe 58 connects to the conduits 22, 44 and is hollow to receive and communicate the oil-water mixtures to the first and second volumes V1, V2 of the separator tanks 24, 26. The oil-water mixture exits the branch outlets 60 via apertures 61 to enter the volumes V1, V2. The central pipe 58 is sealed off at its bottom end 63. The diameter of the central pipe 58 will vary depending upon the size of the separator tank in which it is mounted.

The plurality of branch outlets 60 extend transversely from the central pipe 58, and extend perpendicularly, in one example. In one example, the branch outlets 60 are welded to the central pipe 58. The actual number of branch outlets 60 included on the intake pipes 32, 44 is dependent upon the size of the separator tank 24, 26 for which the intake pipe 32, 44 is mounted within and the flow requirements of the example oil spill recovery system 10. In one example, the diameter of the plurality of branch outlets 60 is smaller than the diameter of the central pipe 58. The branch outlets 60 provide a reduction of pressure to the oil-water mixture located within the central pipe 58 and allow for the continuous communication of the oil-water mixture from the conduits 22, 44 to the volumes V1, V2. Therefore, a reduced amount of time is required to complete the oil spill recovery.

In one example, the number of branch outlets 60 provided on the intake pipe 32 of the first separator tank 24 is different from the number of branch outlets 60 of the second intake pipe 48 of the second separator tank 26 because of the relative volume difference between the first separator tank 24 and the second separator tank 26. A person of ordinary skill in the art having the benefit of this disclosure would be able to select the size, quantity and positioning of the branch outlet 60 for each separator tank 24, 26 based upon design specific parameters.

Figure 4:
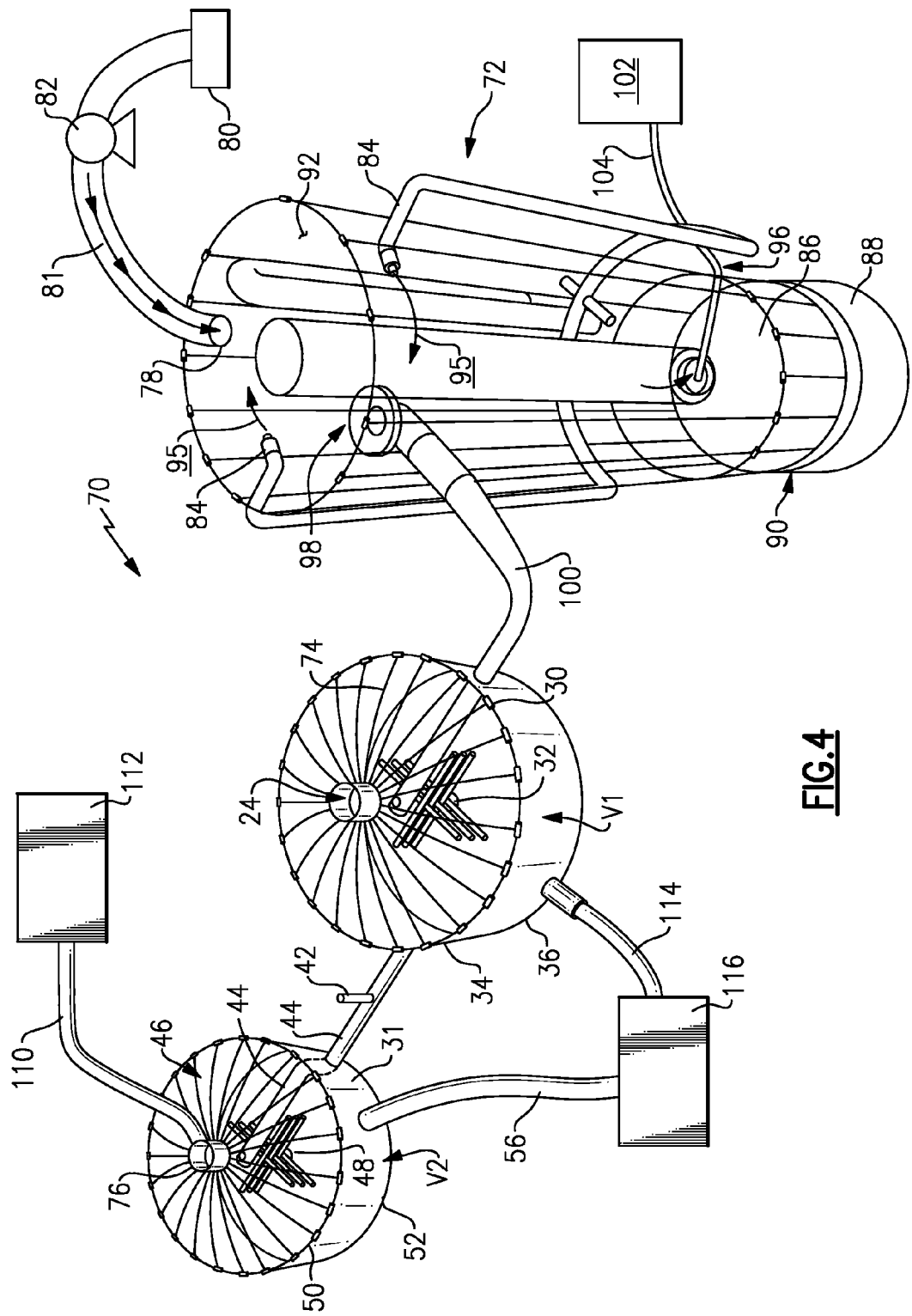
FIG. 4 is a perspective view of another example oil spill recovery system.
Figure 5:
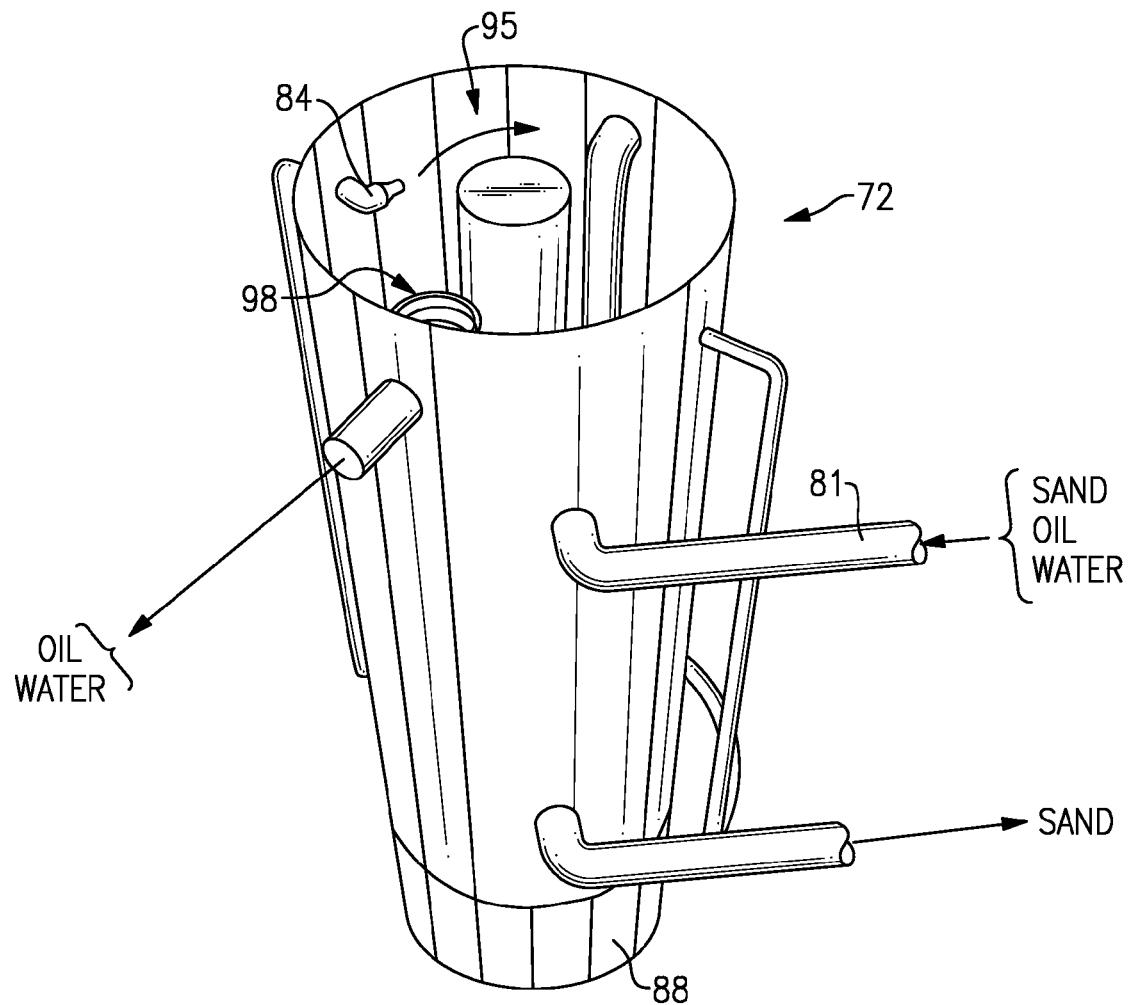
FIG. 5 is a perspective view of an example sand, oil and water separation tank.

Referring to FIGS. 4 and 5, a second example oil spill recovery system 70 is illustrated. The oil spill recovery system 70 is a multiple stage recovery system. The oil spill recovery system 70 may be utilized to clean a contaminated area such as a body of water, waterway, or any type of land mass. In one example, the oil spill recovery system 70 is capable of separating an oil-sand-water mixture. Although described in terms of the separation of sand, oil and water, it should be understood that gas, diesel or any other substances may be separated by the example oil spill recovery system 70.

The oil spill recovery system 70 includes a first separator tank 72 and a second separator tank 74. In one example, the first separator tank 72 is operable to separate sand and oil and the second separator tank is operable to separate oil and water, as is further discussed below. The second separator tank 74 may include multiple stages to adequately separate the water and the oil. For example, the second separator tank 74 may include the oil-water separator 18 discussed above with respect to the oil spill recovery system 10.

The first separator tank 72 includes an inlet 78 for receiving an oil-sand mixture. Similar to the oil spill recovery system 10, a collector head 80 and a pump 82 are utilized to lift an oil-sand mixture from a contaminated area and communicate the mixture through a conduit 81 and the inlet 78 such that the mixture enters a volume of the first separator tank 72.

The first separator tank 72 also includes a pressurized nozzle 84 for injecting boiling water within the first separator tank 72. In one example, the first separator tank 72 includes a plurality of pressurized nozzles 84 disposed within the tank 72 and operable to inject boiling water within the first separator tank 72. A pump 82, such as a gear pump, may be used to inject the boiling water. In another example, the pressurized nozzles 84 are stainless steel. At least one of the pressurized nozzles 84 is positioned at an angle toward a bottom end 86 of the first separator tank 72. The pressurized nozzles create a whirl-pool effect within the first separator tank 72 that facilitates the separation of the sand and the oil. A person of ordinary skill in the art having the benefit of this disclosure would be able to determine the appropriate size, quantity, positioning and material of the pressurized nozzles 84 to create the whirl-pool effect and adequately separate the oil and the sand.

A heater 88 is provided within a recess 90 positioned adjacent to the bottom end 86 of the first separator tank 72. In one example, the heater 88 is a gas heater. In another example, the heater 88 is an electric heater. It should be understood that any type of heater is within the contemplation of this disclosure. The heater 88 maintains the water within the first storage tank 72 at or near a boiling point. The heater 88, in combination with the pressurized nozzles 84, brings the oil-water mixture toward a top end 92 of the first separator tank and draws the sand toward the bottom end 86 of the first separator tank 72. The first separator tank 72 further includes a sand discharge outlet 96 and an oil-water outlet 98 for discharging the sand and the oil-water mixture from the first separator tank 72.

To separate an oil, water and sand mixture with the oil spill recovery system 70, the first separator tank 72 is filled with boiling water such that a portion of the hot water backs up into the second separator tank 74 via a conduit 100 which connects the first separator tank 72 to the second separator tank 74. An oil-sand mixture is pumped through the inlet 78 of the first separator tank 72 via the conduit 81. The conduit 81 connects the first separator tank 72 to the pump 82 and the collector head 80.

The boiling water facilitates the separation of the oil-sand mixture into an oil-water phase and a sand phase. The sand gravitates toward the bottom end 86 of the first separator tank 72 and the oil-water mixture rises towards the top end 92 of the first separator tank 72. The pressurized nozzles 84 of the first separator tank 72 facilitate the separation of the sand from the oil and water by creating the whirl-pool effect therein. The pressurized nozzles 84 inject additional boiling water into the first separator tank 72 after the sand-oil mixture is pumped into the first separator tank 72. Once separated, the sand is pumped from the first separator tank 72 into a separate storage tank 102. Meanwhile, the oil-boiling water mixture is communicated through the oil-water outlet 98 and into the second separator tank 74 via a conduit 104.

Next, the second and third separator tanks 74, 76 facilitate the separation of the oil-water mixture in a manner substantially similar to the oil spill recovery system 10. It should be understood that the second and third separator tanks 74, 76 may include a multitude of separator tanks to achieve greater separation of the water from the oil. The second and third separator tanks 74, 76 may also include a heater 88 to facilitate improved separation of the water and the oil. A third separator tank 76 receives the oil water mixture from the first separator tank 74 and performs an additional separation of oil and water. The separated oil is communicated via a discharge oil conduit 110 to an oil storage tank 112.

The separated water is communicated via a discharge water conduit 114 to either a water reservoir 116 or returned to the body of water from which it was removed. In one example, a pump is utilized to remove the water and oil from the second separator tank 26. In another example, the discharge conduits 110, 114 are gravity fed.

The foregoing description shall be interpreted as illustrative and not in any limiting sense. A worker of ordinary skill in the art would recognize that certain modifications would come within the scope of this disclosure. For this reason, the following claims should be studied to determine the true scope and content of the present disclosure.

What is claimed is:

1. A method for separating an oil-substance mixture, comprising the steps of:
   (a) extracting the oil-substance mixture from a body of water;
   (b) communicating the oil-substance mixture into a first separator tank to separate the oil from the substance; and
   (c) communicating a remaining portion of the oil-substance mixture into a second separator tank to separate the oil from the substance of the remaining portion, wherein at least one of the first separator tank and the second separator tank includes an intake pipe having a vertically disposed central pipe and a plurality of branch outlets that transversely extend from the central pipe along a length of the central pipe, wherein the oil-substance mixture is communicated through the plurality of branch outlets and into the first tank and second tank.

2. A method for separating an oil, water, and sand mixture, comprising the steps of:
   (a) communicating an oil-sand mixture into a first separator tank;
   (b) injecting pressurized boiling water into the first separator tank to separate the oil from the sand; and
   (c) communicating the oil and the boiling water from the first separator tank into a second separator tank to separate the oil from the boiling water, wherein the oil and the boiling water are communicated into an intake pipe of the second separator tank, through a plurality of apertures and into a volume of the second separator tank.

3. The method as recited in claim 2, wherein said step (b) comprises the step of:
   heating the first separator tank and the second separator tank to maintain the boiling water at boiling point.

4. The method as recited in claim 2, wherein said step (b) comprises the step of:
   completely filling the first separator tank during the step of injecting.

5. The method as recited in claim 2, wherein said step (c) comprises the step of:
   maintaining a constant pressure within the second separator tank to facilitate the separation of the oil and the boiling water.

6. The method as recited in claim 5, wherein said step (c) comprises the steps of:
   communicating the oil and the boiling water into a third separator tank; and
   repeating each of said steps of claim 5 in the third separator tank.

7. The method as recited in claim 2, comprising the step of:
   (d) storing the separated sand, the separated oil and the separated water in separate storage tanks.

8. The method as recited in claim 2, wherein a portion of the boiling water backs up into the second separator tank.

9. The method as recited in claim 2, wherein said step (b) includes injecting the boiling water into the first separator tank with at least one pressurized nozzle.

10. The method as recited in claim 2, comprising the step of:
  d) communicating at least a portion of the oil and the boiling water from the second separator tank into a third separator tank to further separate the oil from the boiling water.

11. The method as recited in claim 2, wherein said step (c) includes communicating the oil and the boiling water through an intake pipe of the second separator tank, wherein the intake pipe includes a central pipe and a plurality of branch outlets that protrude from the central pipe.

12. The method as recited in claim 1, wherein the first separator tank includes a first volume and the second separator tank includes a second volume that is different from the first volume.

13. The method as recited in claim 1, comprising the step of maintaining the first separator tank and the second separator tank under constant pressure.

14. The method as recited in claim 1, wherein said steps (a) and (c) steps (b) and (c) include communicating the oil-substance mixture through intake pipes disposed inside of each of the first separator tank and the second separator tank, wherein the intake pipes includes a central pipe and a plurality of branch outlets that protrude from the central pipe.

15. A method for separating an oil-water mixture, comprising the steps of:
  communicating the oil-water mixture into a first separator tank having a first volume;
  communicating at least a portion of the oil-water mixture into a second separator tank having a second volume that is different from the first volume, wherein each of the first separator tank and the second separator tank includes an intake pipe having a vertically disposed central pipe and a plurality of branch outlets that transversely extend from the central pipe along a length of the central pipe; and
  communicating the oil-water mixture through the plurality of branch outlets and into the first volume and the second volume.

16. The method as recited in claim 15, wherein the intake pipe of the first separator tank and the intake pipe of the second separator tank include a different number of the plurality of branch outlets.

17. The method as recited in claim 15, wherein a diameter of each of the plurality of branch outlets is smaller than a diameter of the central pipe.

* * * * *